US006941075B2

(12) United States Patent
Michishita et al.

(10) Patent No.: US 6,941,075 B2
(45) Date of Patent: Sep. 6, 2005

(54) WAVELENGTH DIVISION MULTIPLEXING OPTICAL TRANSMISSION METHOD AND SYSTEM

(75) Inventors: Yukio Michishita, Tokyo (JP); Hiroaki Murakami, Tokyo (JP)

(73) Assignee: NEC Corporation, Tokyo (JP)

( * ) Notice: Subject to any disclaimer, the term of this patent is extended or adjusted under 35 U.S.C. 154(b) by 620 days.

(21) Appl. No.: 09/918,438

(22) Filed: Aug. 1, 2001

(65) Prior Publication Data

US 2002/0015202 A1 Feb. 7, 2002

(30) Foreign Application Priority Data

Aug. 2, 2000 (JP) ....................................... 2000-234824

(51) Int. Cl.[7] ................................................ H04B 10/00
(52) U.S. Cl. .......................... 398/94; 398/197; 398/160
(58) Field of Search .......................... 398/94, 195, 197, 398/162, 160

(56) References Cited

U.S. PATENT DOCUMENTS 6,426,817 B1 * 7/2002 Tomita ........................ 398/82
6,449,074 B1 * 9/2002 Okano et al. ................. 398/91
6,522,803 B1 * 2/2003 Nakajima et al. ............. 385/24

FOREIGN PATENT DOCUMENTS

JP 11-252047 9/1999

* cited by examiner

*Primary Examiner*—M. R. Sedighian
*Assistant Examiner*—Christina Y. Leung
(74) *Attorney, Agent, or Firm*—McGinn & Gibb, PLLC

(57) ABSTRACT

In a 32-channel wavelength division multiplexing optical transmission system, for example, four optical transmitters are grouped in eight groups. Each group is provided with a control optical transmitter. The control light transmitter regulates the level of a control light so that the total level of light transmitted from the corresponding group is equal to the total level of four signal lights. An optical transmission line of the above-mentioned system is normally regulated beforehand so that the wavelength characteristic of the following signal lights is flat when light at the total level of thirty-two signal lights in a predetermined range of wavelengths is transmitted. Therefore, in the system according to the invention, independent of the number of signal lights, the receive level of a signal light is unchangeable.

16 Claims, 10 Drawing Sheets

WAVELENGTH DIVISION MULTIPLEXING OPTICAL TRANSMISSION METHOD AND SYSTEM

BACKGROUND OF THE INVENTION

1. Field of the Invention

The present invention relates to wavelength division multiplexing (hereinafter called WDM) optical transmission, particularly relates to WDM optical transmission method and system wherein transmission characteristics are not influenced by the increase or the decrease of signal lights.

2. Description of the Related Prior Art

In a WDM optical transmission system, plural signal lights the respective wavelengths of which are different are multiplexed and are transmitted via an optical fiber. Therefore, a data amount propagated in one optical fiber rapidly increases. As shown in FIG. 1, a conventional type 32-channel WDM optical transmission system is provided with thirty-two optical transmitters 1—1 to 1-32, an optical multiplexer 2, an optical transmission line 3, an optical demultiplexer 4 and thirty-two optical receivers 5-1 to 5-32. The optical transmitter 1—1 modulates a laser beam according to an electric signal i1 and outputs a signal light A1. The other optical transmitters also respectively output a signal light of each different wavelength (for example, an interval between wavelengths is 0.4 nm). The optical multiplexer 2 multiplexes signal lights A1 to A32 and outputs a wavelength multiplexed signal light B to the optical transmission line 3. The optical transmission line 3 is provided with an optical fiber 3*a* and an erbium-doped fiber amplifier (hereinafter called EDFA) 3*b*. The optical demultiplexer 4 demultiplexes the multiplexed signal light B transmitted via the optical transmission line 3 every wavelength and outputs signal lights of thirty-two channels C1 to C32. The optical receivers 5-1 to 5-32 demodulate these signal lights to electric signals.

EDFA arranged on the optical transmission line of the above-mentioned conventional type WDM optical transmission system has a wavelength characteristic. That is, the amplification degree of EDFA slightly has dependency upon a wavelength. A wavelength multiplexed signal light propagated on the optical transmission line has difference in the level of a signal light according to a wavelength. Therefore, in the 32-channel WDM optical transmission system shown in FIG. 1, EDFA is regulated beforehand so that no difference in a level is made between thirty-two signal lights different in a wavelength (that is, the wavelength characteristic is flat) when thirty-two signal lights are transmitted.

However, when the operation of this WDM optical transmission system is started, a case that all signal lights of 32 channels are transmitted is rare. Ordinarily, a signal light often increases by degrees as subscribers and the demand increase. Therefore, it means the increase of initial investment that channels unused when the operation of the above-mentioned system is started are installed. When the power of light input to the optical transmission line is smaller than that of 32-channel signal lights, the wavelength characteristic of EDFA may be not flat and the level of a signal light the wavelength of which is short of a wavelength multiplexed signal light may be deteriorated. When an input level to the optical receiver is insufficient, the level of an electric signal may be deteriorated and no electric signal may be output.

Japanese published unexamined patent application No. Hei 11-252047 discloses a 16-channel optical wavelength multiplexing system wherein when an unused channel exists, light of a wavelength different from that of a signal light is transmitted together with the signal light to prevent the characteristic of the signal light from being deteriorated and to control the increase of initial investment. However, in this system, as light of one wavelength different from that of a signal light is transmitted, the gain profile of EDFA changes when the number of channels is increased and it may influence the characteristic of another signal light.

SUMMARY OF THE INVENTION

Therefore, a first object of the invention is to control the increase of initial investment in a multiple-channel WDM optical transmission system. A second object is to prevent the increase of signal lights on the transmit side from influencing the level of each signal light on the receive side in the WDM optical transmission system.

To achieve the objects, a WDM optical transmission method according to the invention includes a step for grouping transmittable n (n: 4 or a larger integer) pieces of signal lights by x pieces (x: integer, $2 \leqq x < n$) and a step for transmitting a control light having the same power as the total power of signal lights not transmitted in the corresponding group in case the number of transmitted signal lights is smaller than x in each group. Another WDM optical transmission method according to the invention includes s step for grouping transmittable n (n: 4 or a larger integer) pieces of signal lights by x pieces (x: integer, $2 \leqq x < n$) and a step for transmitting a control light having the same power of the total power of signal lights not transmitted in the corresponding group in case the number of transmitted signal lights is smaller than x in each group and having the same wavelength as the wavelength of a signal light to be finally transmitted in the corresponding group. In a desirable embodiment of the above-mentioned invention, the total level of the control light and signal lights are equal to the total level of x pieces of signal lights in the corresponding group. An optical transmission line on which signal lights and a control light are propagated can be preset so that in case multiplexed light including n pieces of signal lights is propagated, the wavelength characteristic is flat.

A WDM optical transmission system according to the invention is based upon a system wherein n (n: 4 or a larger integer) pieces of signal lights can be transmitted, and is provided with (1) one or more signal light transmitters that respectively transmit a signal light, (2) a first optical multiplexer having input ports to which x (x: integer, $2 \leqq x < n$) pieces of signal lights are input, (3) an optical branching device that branches light output from the first optical multiplexer, (4) a control light transmitter that transmits a control light based upon the level of light branched from the optical branching device, (5) a second optical multiplexer that multiplexes light output from the first optical multiplexer and the control light, (6) an optical transmission line on which a multiplexed light output from the second optical multiplexer is propagated, (7) an optical demultiplexer that demultiplexes the light transmitted via the optical transmission line into signal lights of respective different wavelengths and (8) optical receivers that respectively receive a signal light demultiplexed by the optical demultiplexer. A desirable embodiment of the WDM optical transmission system according to the invention is as follows. The control light transmitter outputs a control light of power equivalent to difference between the level of the following branched light and the total level of the following signal lights in case the level of light branched from the branching device is lower than the total level of x pieces of signal lights. The control light has the same wavelength as that of signal lights last transmitted from x pieces of signal light transmitters corresponding to the control light transmitter. The above-mentioned optical transmission line is regulated so that in case light acquired by multiplexing n pieces of signal lights is propagated, the wavelength characteristic is flat. Multiplexed light output from the second optical multiplexer has a level at which the wavelength characteristic is flat on the optical transmission line.

Another WDM optical transmission system according to the invention is based upon a system wherein n (n: 4 or a larger integer) pieces of signal lights can be transmitted, is provided with (1) one or more signal light transmitters that respectively transmit a signal light, (2) a first optical multiplexer having input ports to which x (x: integer, $2 \leqq x < n$) pieces of signal lights are input, (3) an optical branching device that branches light output from the first optical multiplexer, (4) a control light transmitter that transmits a control light based upon the level of light branched from the optical branching device, (5) a second optical multiplexer that multiplexes light output from the first optical multiplexer and the control light, (6) an optical transmission line on which multiplexed light output from the second optical multiplexer is propagated, (7) an optical demultiplexer that demultiplexes the light propagated via the optical transmission line into signal lights of respective different wavelengths and (8) optical receivers that respectively receive a signal light demultiplexed by the optical demultiplexer, further, the above-mentioned control light transmitter outputs a control light of power equivalent to difference between the level of the following branched light and the total level of the following signal lights in case the level of light branched from the branching filter is lower than the total level of x pieces of signal lights, and the control light has the same wavelength as that of signal lights last transmitted from x pieces of signal light transmitters corresponding to the control light transmitter.

In the above-mentioned WDM optical transmission method and system, even if the number of transmitted signal lights is increased after the operation of the system is started, the receive level of each signal light is kept a predetermined value.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
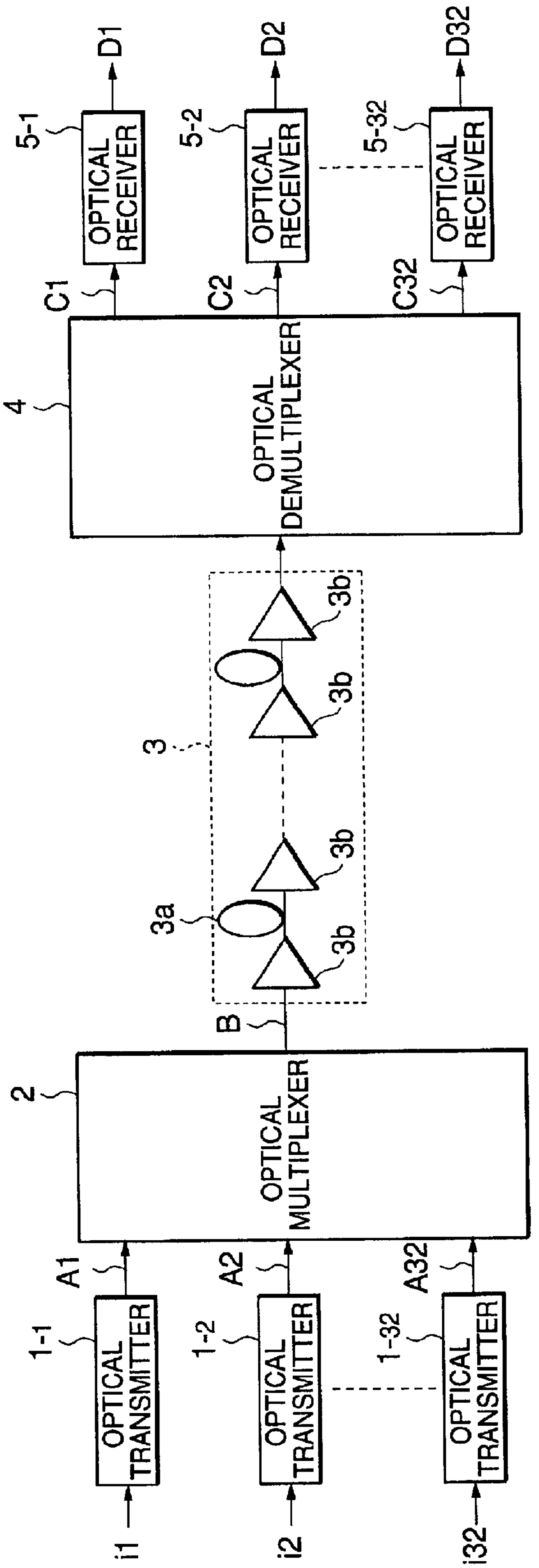
FIG. 1 is a block diagram showing a conventional type WDM optical transmission system.
Figure 2:
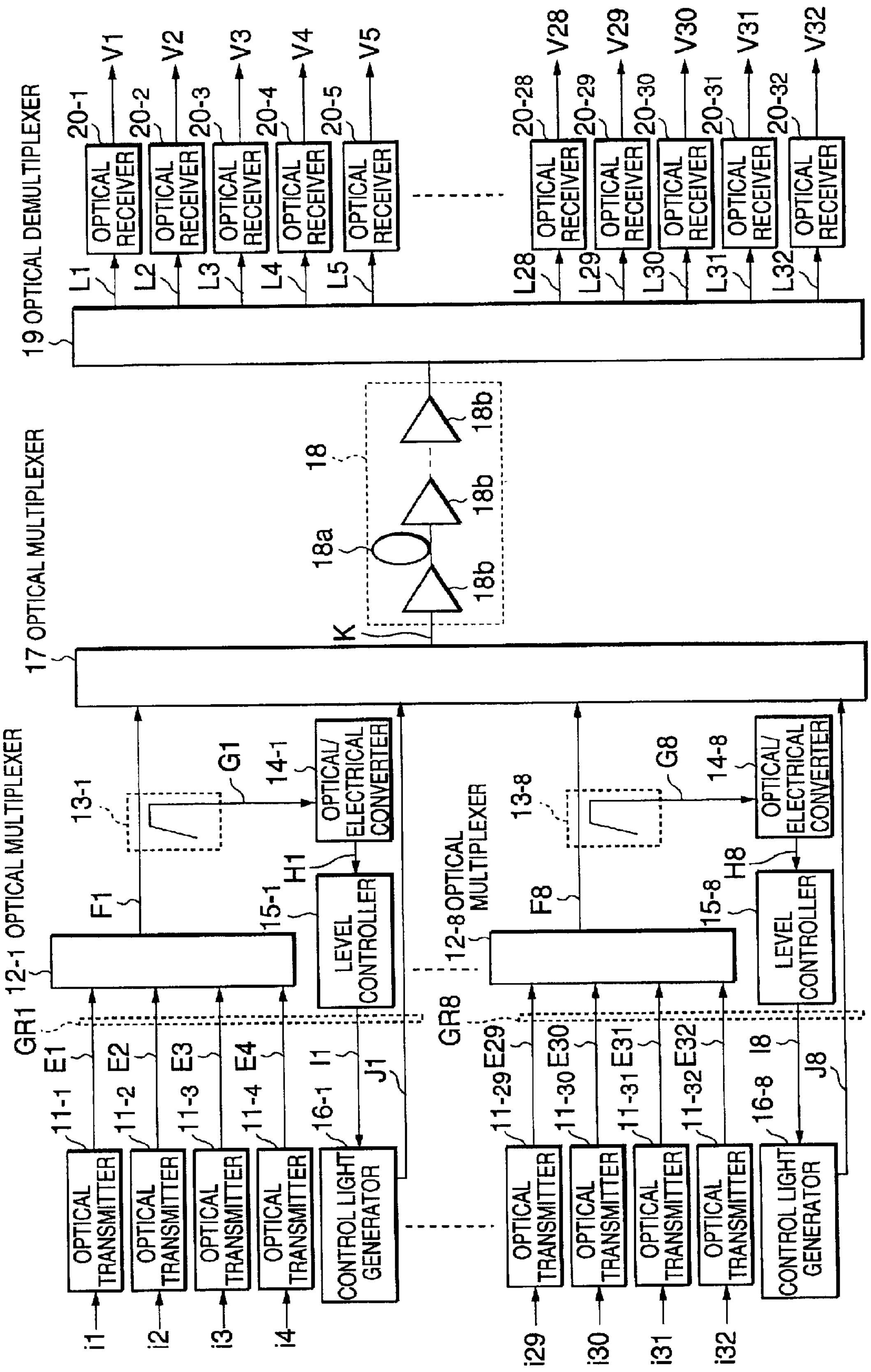
FIG. 2 is a block diagram showing a WDM optical transmission system equivalent to an embodiment of the invention.

Referring to FIG. 2, in a 32-channel WDM optical transmission system, thirty-two optical transmitters 11-1 to 11-32 are grouped into eight groups by four pieces. An optical multiplexer 12-1 multiplexes signal lights E1 to E4 respectively output from four optical transmitters 11-1 to 11-4 and outputs a wavelength multiplexed light F1. However, in case the operation of the system is started with channels smaller than thirty-two channels, optical transmitters are installed by the required number. At this time, the number of signal lights in a wavelength multiplexed light F1 may be 3, 2, 1 or zero. The number of zero means that no optical transmitter 11-1 to 11-4 is installed and no signal light E1 to E4 (that is, no wavelength multiplexed light F1) exists. An optical branching device 13-1 branches the multiplexed light F1, outputs one branched light to an optical multiplexer 17 and outputs the other branched light G1 to an optical/electrical converter 14-1. The optical/electrical converter 14-1 sends an electric signal H1 corresponding to the level of the branched light G1 to a level controller 15-1. The level controller 15-1 calculates the level of a control light to be sent based upon the electric signal H1 and sends a control signal I1 to a control light generator 16-1. The control light generator 16-1 outputs a control light J1 based upon the control signal I1 to the optical multiplexer 17. The control light means a continuous wave (CW) light including no information for example. The total level of the control light J1 and the wavelength multiplexed light F1 at this time are equal to the total level of the signal lights E1 to E4. When no wavelength multiplexed light F1 is output (that is, no signal light is output from the optical transmitters 11-1 to 11-4), the level of the control light J1 is equal to the total level of the four signal lights. When the signal lights E1 to E4 are sent, no control light is sent. In the system according to the invention, in each group of optical transmitters, the priority of used signal lights can be predetermined. It is desirable that the wavelength of the control light is the wavelength of a signal light which is the lowest in the priority of use in each group, that is, the wavelength of a signal light last sent in the group. The reason is that the control light generator has only to have only a light source of a single wavelength. The other optical transmitters 11-5 to 11-32 are also grouped by 4 pieces. Each group has the similar configuration and in each group, the similar operation is executed. Two, eight or sixteen optical transmitters, for example, may be also grouped. According to the number of channels, optical transmitters of the further different number may be also grouped. The number of optical transmitters (that is, signal lights) composing a group may be also different between groups.

The optical multiplexer 17 multiplexes usually input signal lights and a control light and transmits a wavelength multiplexed light K to an optical transmission line 18. The optical transmission line 18 is provided with an optical fiber 18*a* and EDFA 18B. Normally, plural EDFAs 18*b* are arranged on the optical transmission line. The gain of these EDFAs 18*b* is regulated so that when a light of the same level as the total level of thirty-two signal lights 11-1 to 11-32 is propagated on the optical transmission line 18, the wavelength characteristic is flat. An optical demultiplexer 19 demultiplexes the wavelength multiplexed light K transmitted via the optical transmission line 18 every wavelength and outputs signal lights L1 to L32 of thirty-two channels. Optical receivers 20-1 to 20-32 receive each signal light and demodulate output electric signals V1 to V32 of thirty-two channels. The optical receives which correspond to a wavelength unused for a signal light and the wavelength of a control light output no electric signal.

FIGS. 3 to 10 are examples of spectrum atlases showing signal lights and control lights respectively propagated on the optical transmission line. In these spectrum atlases, the y-axis shows the intensity (dB) of light and the x-axis shows the wavelength. Signal lights of thirty-two channels are grouped into eight groups (GR1 to GR8) each group of which includes 4 signal lights. The second shortest wavelength in each group is set as the wavelength of a control light. A signal light of this wavelength is last sent in a group including it.

Figure 3:
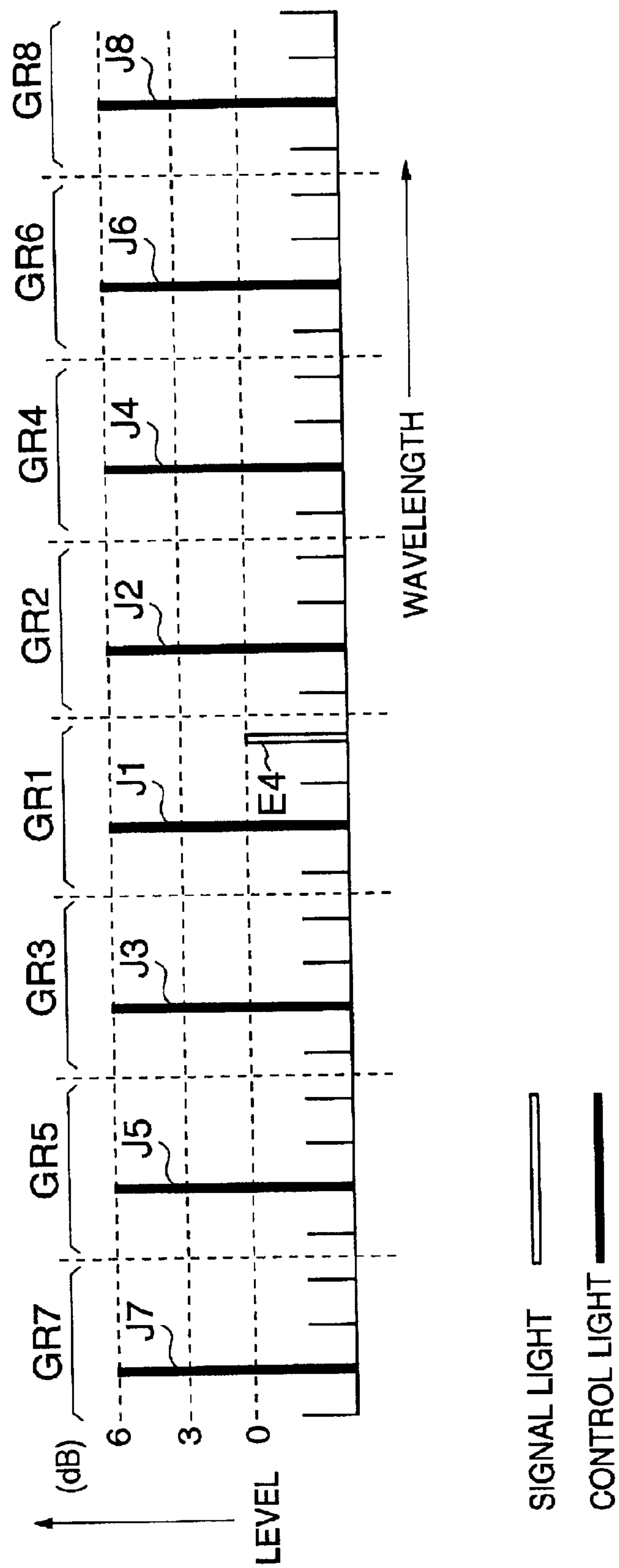
FIG. 3 shows an example of a spectrum atlas of one signal light in the WDM optical transmission system according to the invention.
Figure 4:
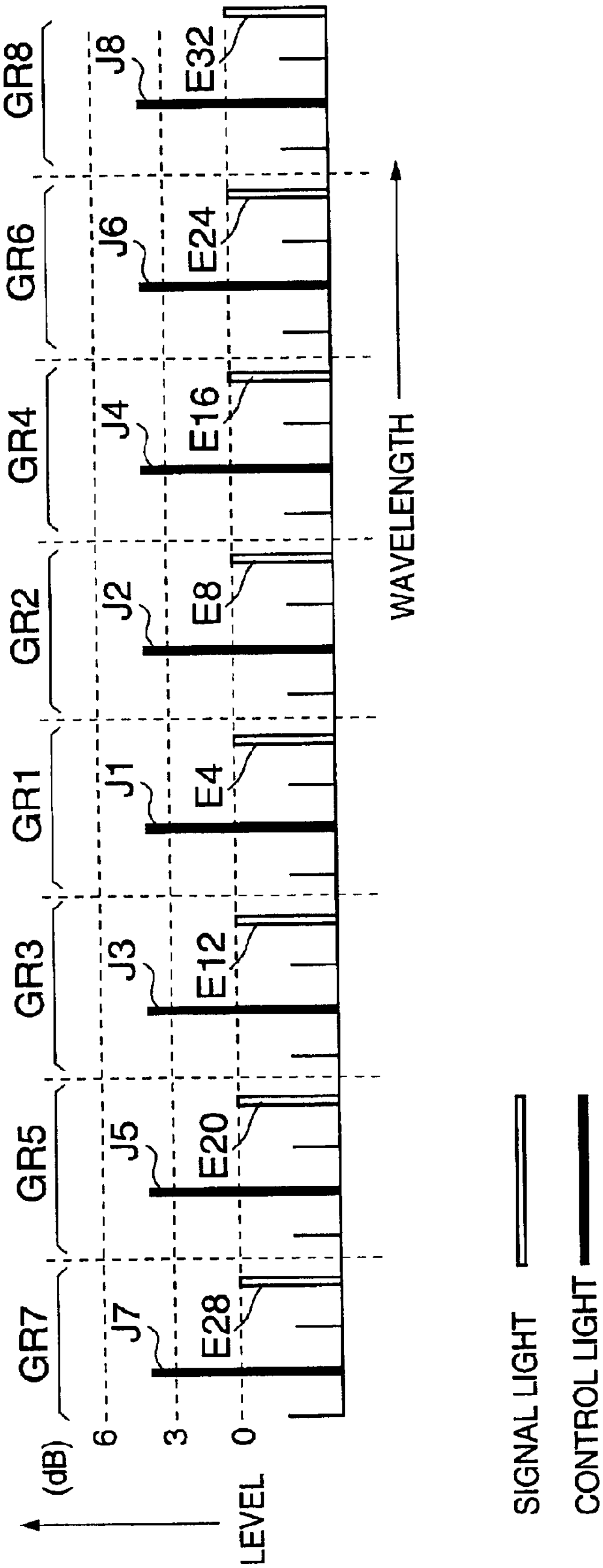
FIG. 4 shows an example of a spectrum atlas of eight signal lights in the WDM optical transmission system according to the invention.
Figure 5:
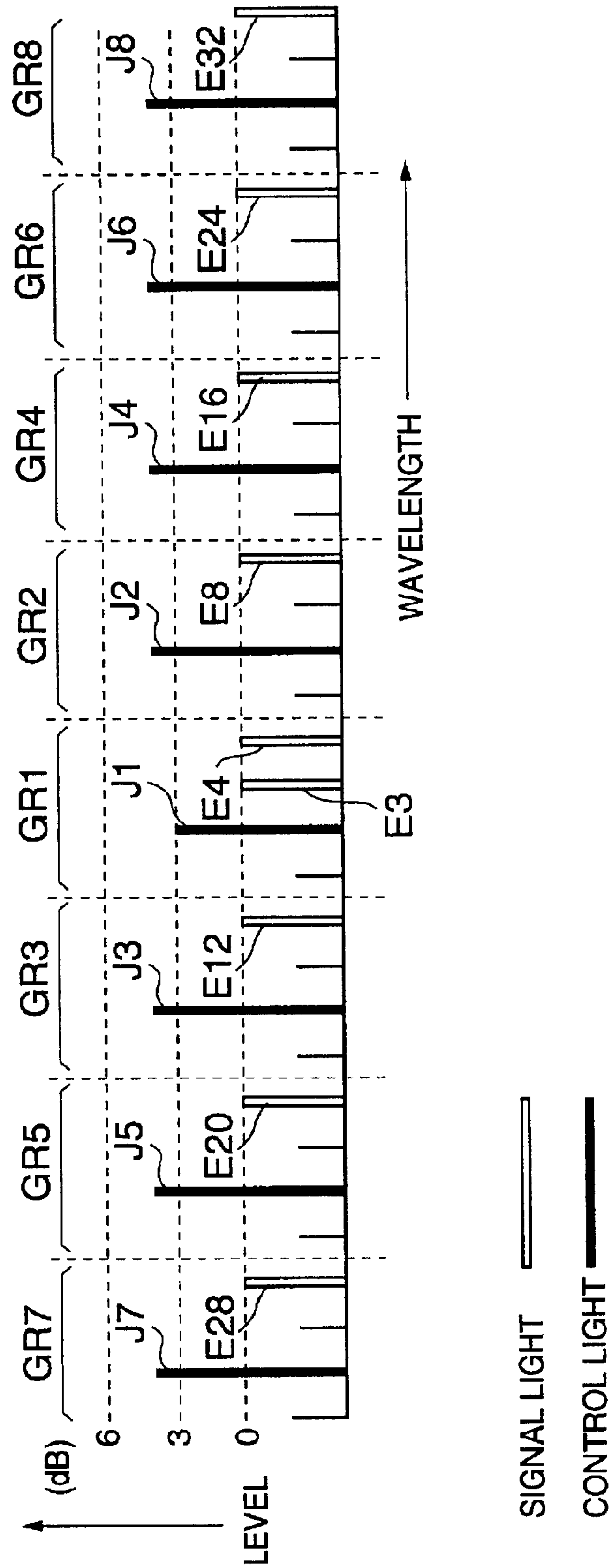
FIG. 5 shows an example of a spectrum atlas of nine signal lights in the WDM optical transmission system according to the invention.
Figure 6:
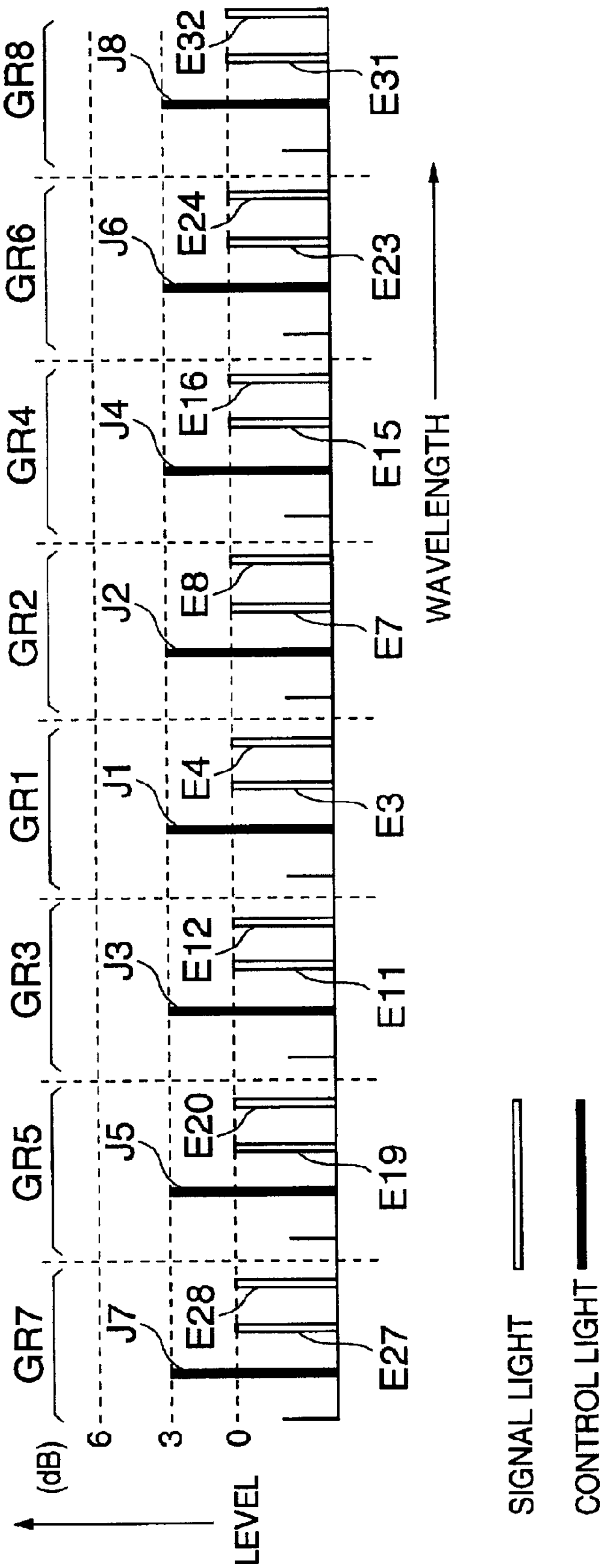
FIG. 6 shows an example of a spectrum atlas of sixteen signal lights in the WDM optical transmission system according to the invention.
Figure 7:
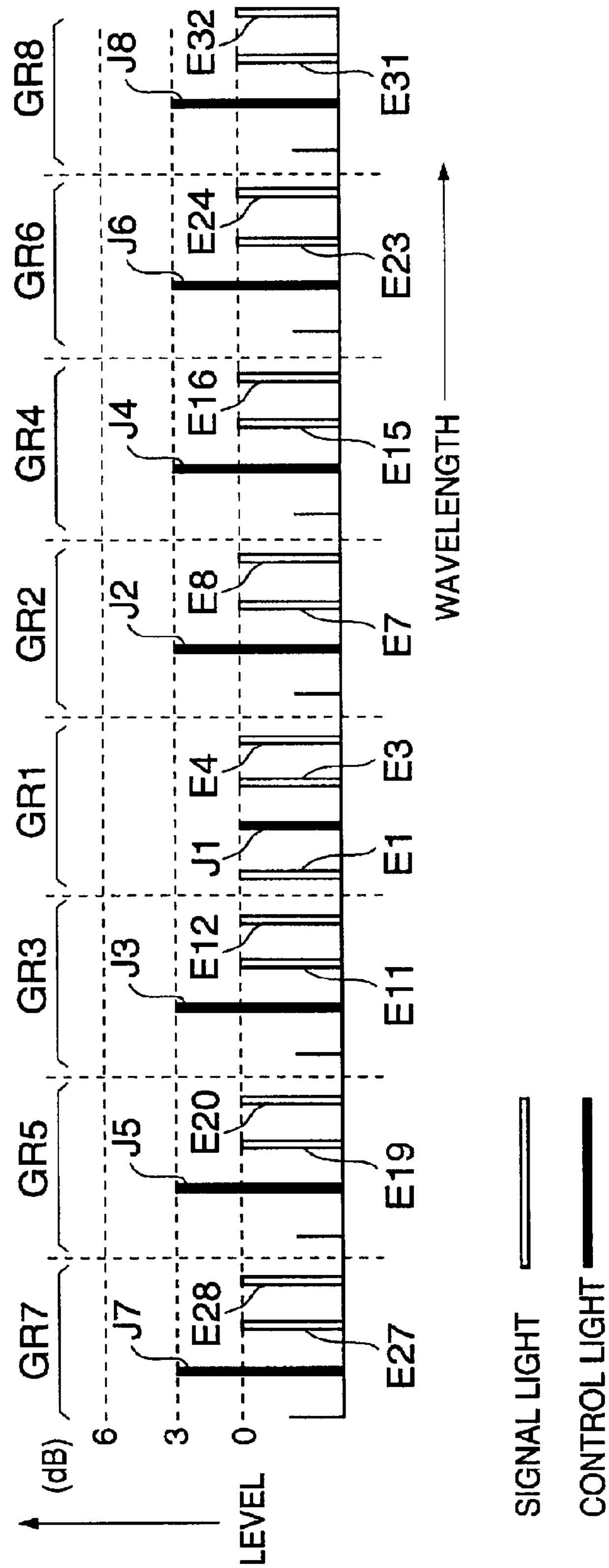
FIG. 7 shows an example of a spectrum atlas of seventeen signal lights in the WDM optical transmission system according to the invention.
Figure 8:
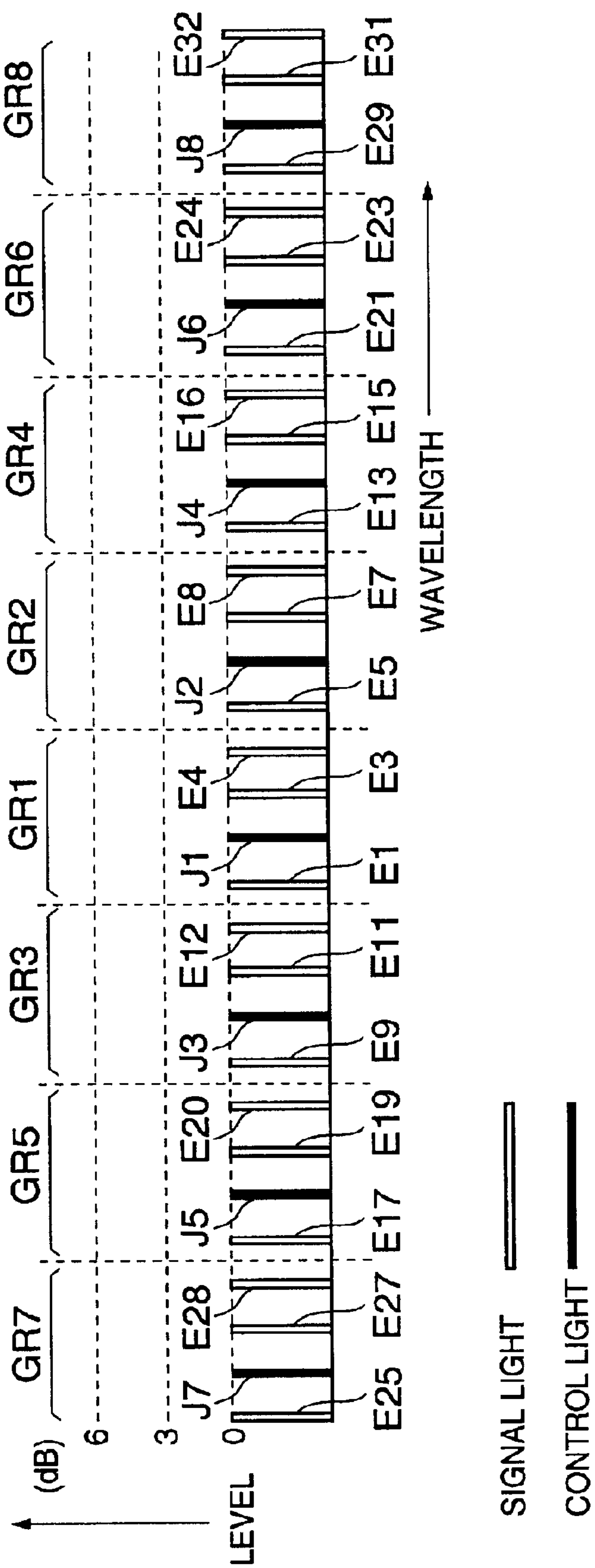
FIG. 8 shows an example of a spectrum atlas of twenty-four signal lights in the WDM optical transmission system according to the invention.
Figure 9:
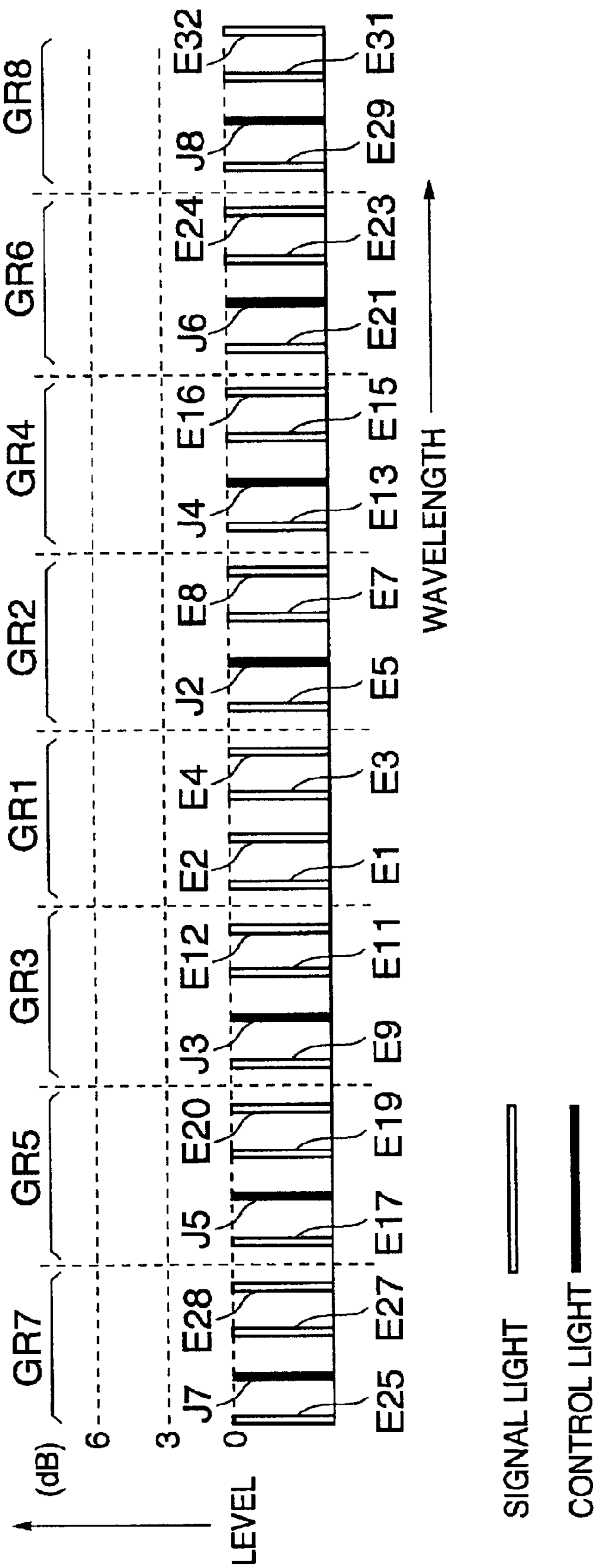
FIG. 9 shows an example of a spectrum atlas of twenty-five signal lights in the WDM optical transmission system according to the invention.
Figure 10:
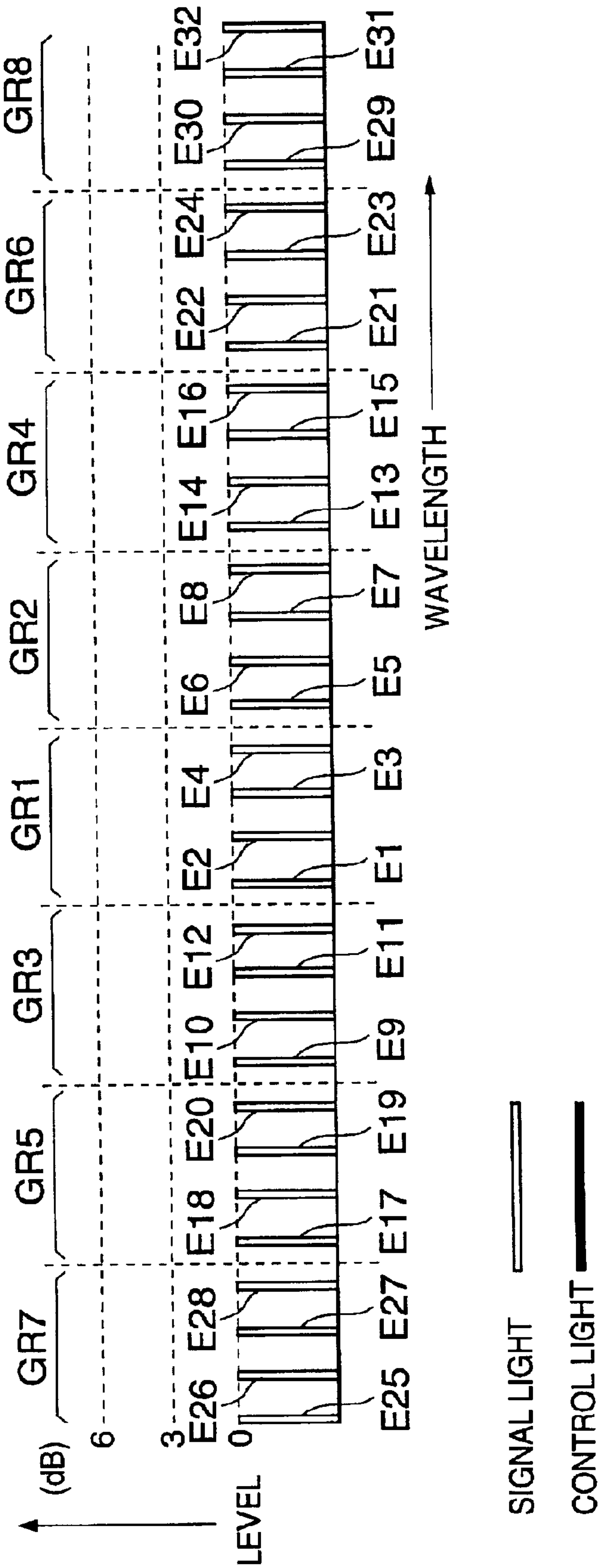
FIG. 10 shows an example of a spectrum atlas of thirty-two signal lights in the WDM optical transmission system according to the invention.

FIG. 3 is the spectrum atlas showing a case that the signal light E4 is output from the optical transmitter 11-4 and no signal light is output from the other optical transmitters. In GR1, the level of the signal light E4 is 0 dB. As only one signal light E1 is output from GR1, the control light J1 of a shorter wavelength by 0.8 nm than the signal light E1 is simultaneously output. At this time, the level of the control light J1 is equivalent to three times (that is, 4.8 dB) of the level of the signal light E1. In each groups (GR2 to GR8) in which no signal light is output, only a control light having the second shortest wavelength in each group is output. At this time, the level of each control light (J2 to J8) is equivalent to the level of the four times of a signal light (that is, 6 dB). FIG. 4 is the spectrum atlas showing a case that each one signal light is output from each group. The level of each signal light is 0 dB and each signal light has the longest wavelength in each group. In the meantime, the level of a control light is equivalent to three times (4.8 dB) of that of the signal light and the control light has the second shortest wavelength in each group. FIG. 5 is the spectrum atlas showing a case that two signal lights E3 and E4 are output from GR1. The level of a control light J1 output from GR1 at this time is equivalent to twice (that is, 3 dB) of that of each signal light. FIG. 6 is the spectrum atlas showing a case that two signal lights are output from all eight groups. At this time, the level of all control lights lowers up to twice (that is, 3 dB) of that of each signal light. FIG. 7 is the spectrum atlas showing a case that three signal lights E1, E3 and E4 are output from GR1. The level of a control light J1 output from GR1 at this time is the same (that is, 0 dB) as that of each signal light. FIG. 8 is the spectrum atlas showing a case that three signal lights are output from all eight groups. At this time, the level of all control lights lowers up to the same level (that is, 0 dB) as that of each signal light. FIG. 9 is the spectrum atlas showing a case that four signal lights E1, E2, E3 and E4 are output from GR1. At this time, no control light J1 is output from GR1. FIG. 10 is the spectrum atlas showing a case that four signal lights are output from all eight groups.

In the WDM optical transmission system, normally, the gain of EDFA on the optical transmission line is regulated corresponding to a range of wavelengths of signal lights transmitted on the optical transmission line and the total level beforehand so that the wavelength characteristic of the signal lights is flat (that is, no difference in a receive level is made between signal lights different in a wavelength). In the above-mentioned example of the 32-channel WDM optical transmission system, in the eight groups respectively including four signal lights, a control light of the same wavelength as that of an actual signal light can be output. The level of a control light is regulated so that the total output level of one group is always 6 dB (that is, the total level of four signal lights) and light at the same level as the total level of 32-channel signal lights is transmitted on the optical transmission line. Therefore, in the invention, even if the number of signal lights (that is, the optical transmitters) is increased, the variation of the gain is suppressed in a band of signal lights, a flat wavelength characteristic is keep and the receive level of a signal light is never deteriorated.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A wavelength division multiplexing optical transmission method wherein n (n: 4 or a larger integer) input signal light channels are connected to be transmitted, said method comprising:

grouping transmittable n (n: 4 or a larger integer) input signal light channels into groups each having x channels (x: integer, $2<x<n$); and for each group, whenever one or more of said x input channels does not currently include an input signal to be transmitted in said channel, transmitting a control light having a same power level as a total power of signal lights of said one or more missing input signals.

2. A wavelength division multiplexing optical transmission method according to claim 1, wherein:

in case the number of currently-transmitted signal lights in one group is smaller than x, the total level of the currently-transmitted signal lights and the control light is equal to a total possible level of transmittable x pieces of signal lights in the group.

3. A wavelength division multiplexing optical transmission method according to claim 1, wherein:

an optical transmission line on which said signal light and said control light are propagated is preset so that a wavelength characteristic of said optical transmission line is flat as would be in a case that light acquired by multiplexing n pieces of signal lights is propagated.

4. A wavelength division multiplexing optical transmission method according to claim 1, wherein:

a control light to be transmitted in each group has a same wavelength as that of a signal light last transmitted in the group if an input light signal were received in an input channel corresponding to said wavelength.

5. A wavelength division multiplexing optical transmission method according to claim 1, wherein:

the control light comprises a continuous wave (CW) light.

6. A wavelength division multiplexing optical transmission method wherein there are n (n: 4 or a larger integer) input channels so that n pieces of signal lights can be transmitted if input light signals are present on each of said n input channels, said method comprising:

grouping said transmittable n (n: 4 or a large integer) pieces of signal lights into groups each having x pieces (x: integer, $2<x<n$); and in each said group, transmitting a control light having a same power as a total power of signal lights that have not been received as input light signals to be transmitted in the group.

7. The method of claim 6, wherein, for each said group, said control light has a wavelength of an input channel that is last transmitted in said group.

8. A wavelength division multiplexing optical transmission system wherein n (n: 4 or a larger integer) channels of signal lights can be transmitted, said system comprising:

n signal light transmitters that can respectively receive an input signal and transmit a signal light as an input light signal to be transmitted, wherein said n signal light transmitters are classified into groups, each said group comprised of x of said signal light transmitters;

a plurality of first optical multiplexers, each said first optical multiplexer provided with x (x: integer, 2<x<n) channels of signal light input ports from one of said groups, each said channel connected to an output of one of said n signal light transmitters;

an optical branching device associated with each said first optical multiplexer that branches light output from the first optical multiplexer;

a control light transmitter associated with each said first optical multiplexer that transmits a control light based upon a level of the branched light from the optical branching device, a wavelength of said control light corresponding to a wavelength of one of said x channels;

a second optical multiplexer that multiplexes light output from the first optical multiplexers;

an optical transmission line on which multiplexed light output from the second optical multiplexer is propagated;

an optical demultiplexer that demultiplexes the light transmitted via the optical transmission line into signal lights of respective different wavelengths; and n optical receivers that receive the signal lights demultiplexed by the optical demultiplexer.

9. A wavelength division multiplexing optical transmission system according to claim 8, wherein:

the control light transmitter outputs a control light of power equivalent to provide a total power level that would be present if all of said x channels had signal lights therein.

10. A wavelength division multiplexing optical transmission system according to claim 8, wherein:

a control light has a same wavelength as that of a signal light last transmitted from said x channels of signal light transmitters corresponding to the control light transmitter.

11. A wavelength division multiplexing optical transmission system according to claim 8, wherein:

the optical transmission line is regulated so that a wavelength characteristic on said optical transmission line is flat in a case in which multiplexed light acquired by multiplexing n channels of signal lights is propagated.

12. A wavelength division multiplexing optical transmission system according to claim 8, wherein:

multiplexed light output from the second optical multiplexer has a level at which a wavelength characteristic on said optical transmission line is flat.

13. An apparatus for wavelenght division multiplexing optical transmission, said apparatus comprising:

n input signal ports, each associated with an input signal at a pre-set wavelength, n being an integer equal to or greater than 4, said n ports being separated into a plurality of groups, each said group having x channels respectively associated with x of said n input signal ports;

wherein, for each said group:

a first multiplexer receiving said x channels of said group and providing a multiplexed optical signal as an output thereof;

a control circuit branches off light in said multiplexed optical signal, measures said branched light, and provides a control light level signal; and a control light generator generates a control light that compensates for any of said x channels that currently have no optical signal therein; and a second multiplexer receiving an output of said first multiplexers of each said group and provides therefrom a multiplexed optical signal of said n channels for an optical transmission line.

14. The apparatus of claim 13, wherein said optical transmission line has been balanced in a wavelength characteristic that is flat when all said n channels have an optical signal currently being transmitted.

15. The apparatus of claim 14, wherein a wavelength of each said control light corresponds to a wavelength of one of said n channels.

16. The apparatus of claim 15, wherein said wavelength of each said control light has been pre-set within each said group.

* * * * *